United States Patent [19]

Klein

[11] Patent Number: 4,493,595
[45] Date of Patent: Jan. 15, 1985

[54] COMPACT MULTIPLE SPINDLE BORING HEAD WITH QUICK CHANGE TOOL SUPPORTS

[75] Inventor: Harold A. Klein, Shawnee, Kans.

[73] Assignee: Colt Industries Operating Corp, New York, N.Y.

[21] Appl. No.: 209,031

[22] Filed: Nov. 21, 1980

Related U.S. Application Data

[63] Continuation of Ser. No. 945,489, Sep. 25, 1978, abandoned.

[51] Int. Cl.³ .............................................. B23B 39/20
[52] U.S. Cl. ........................................ 408/46; 279/77; 279/103; 408/53
[58] Field of Search ............................ 408/45, 46, 53; 29/26 A; 409/232, 234; 279/1 A, 1 B, 77, 79, 103, 113

[56] References Cited

U.S. PATENT DOCUMENTS

| | | | |
|---|---|---|---|
| 322,969 | 7/1885 | Reiss | 408/46 |
| 796,177 | 8/1905 | Bean | 279/113 |
| 2,329,587 | 9/1943 | Bullard et al. | 408/35 X |
| 3,460,412 | 8/1969 | Clausen et al. | 29/26 X |

FOREIGN PATENT DOCUMENTS 1309742 10/1962 France ............................ 408/226

Primary Examiner—Z. R. Bilinsky
Attorney, Agent, or Firm—Sixbey, Friedman & Leedom

[57] ABSTRACT

A multiple spindle boring head including a plurality of boring spindles simultaneously radially positionable relative to a central boring head axis by a plurality of associated lead screws which are mounted for rotation but not translation relative to their respective longitudinal axes, whereby the overall radial extent of the boring head remains constant relative to the boring head central axis as the boring heads are adjusted radially. In one embodiment, a pair of multiple spindle boring heads are mounted adjacent one another on a boring machine equipped with an indexable work table to permit simultaneous operations on two work pieces. A quick change tool support means is disclosed to permit very rapid change of tools in each boring spindle without requiring the use of a positioning jig.

15 Claims, 6 Drawing Figures

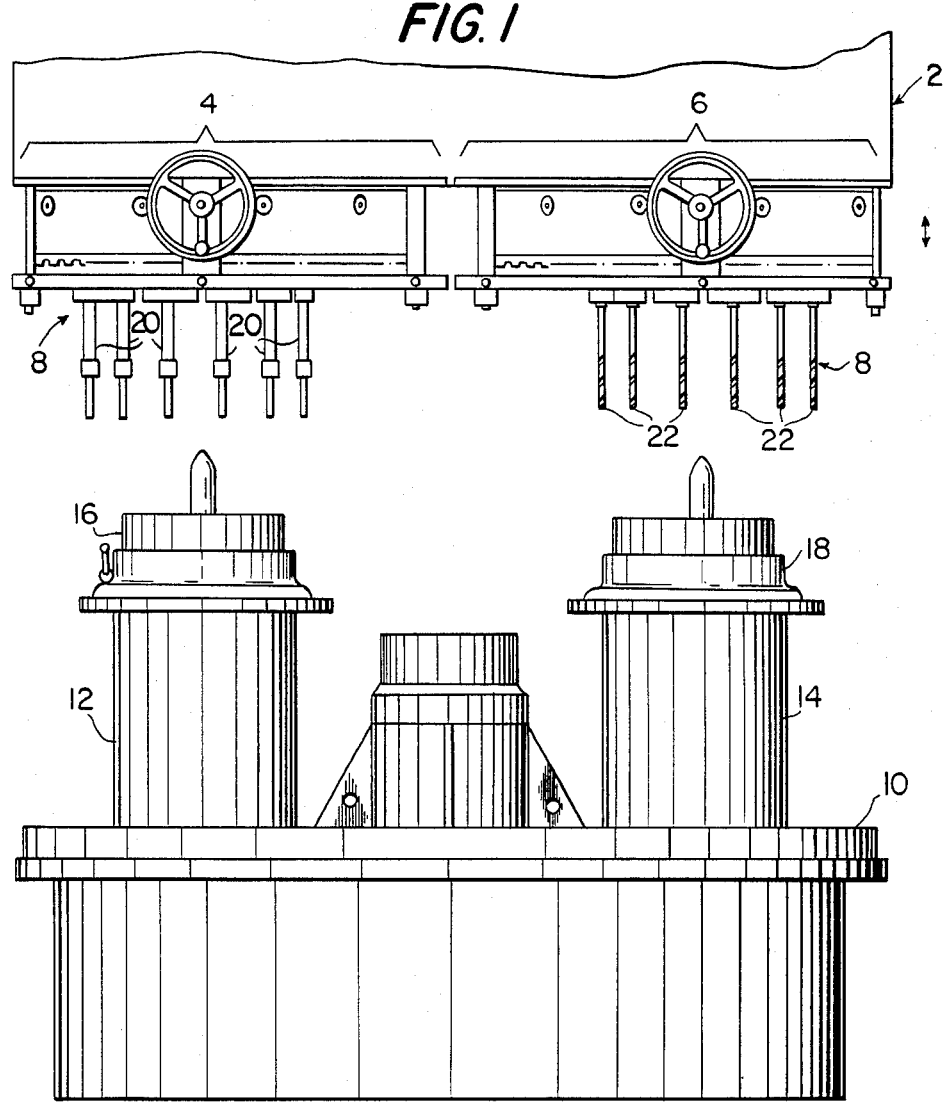
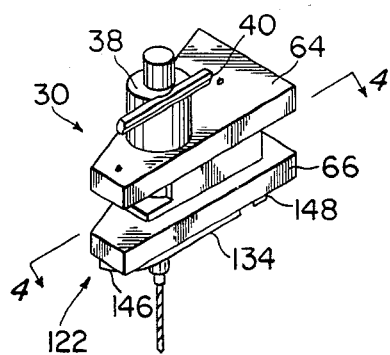

COMPACT MULTIPLE SPINDLE BORING HEAD WITH QUICK CHANGE TOOL SUPPORTS

This application is a continuation of application Ser. No. 945,489, filed Sept. 25, 1978, abandoned.

BACKGROUND OF THE INVENTION (1) Field of the Invention

This invention relates to multi-spindle boring apparatus wherein the spindles may be moved simultaneously in a predetermined pattern.

(2) Discussion of the Prior Art

For many years multiple spindle drilling heads have been employed in large industrial drilling machines to simultaneously drill a group of spaced holes in a workpiece. These simultaneous drilling operations provide significant time savings over single drill units which require that either the drill or the workpiece be traversed and a new drilling operation set up for each hole. While multiple drill heads with spindles in a fixed position can operate rapidly to form corresponding holes in a workpiece, it is necessary to change the drill head or to employ another machine to drill holes in a different position. Consequently, some attempts have been made to develop multiple spindle drill heads which facilitate the adjustment of the drill spindles to a plurality of positions.

One known adjustable multiple spindle drilling unit employs at least two spaced, circular frames provided with a guide structure having radially extending slots which receive and provide a guideway for drill supporting heads that extend between the frames. To move these heads along the guideways in the frames, screw shafts are connected to each head and extend radially outwardly therefrom in substantial alignment with the longitudinal axis of each slot. A pinion gear is affixed to an outer portion of each screw shaft and is meshed with a circular gear wheel which also meshes with the remaining pinions. Thus, when any screw shaft is rotated to vary the position of a drill supporting head, the position of the remaining heads is equally varied. This structure is particularly well illustrated by U.S. Pat. No. 706,811 to George H. Everson.

Although constructions similar to that disclosed by the Everson patent to permit a plurality of drill spindles to be simultaneously moved from first corresponding positions to second corresponding positions over equal distances, these structures present a number of practical problems. For example, the lead screws extend outwardly along the longitudinal axes of the guide slots like the spokes of a wheel. As the drill spindles and their associated supporting heads are moved outwardly, the operating lead screws also move outwardly and require additional space. Thus the length of the guide slots is limited by the space available to accomodate the lead screw shafts and the degree of movement available for the drill spindles is likewise limited. In cases where it is desirable to use side by side drill heads with multiple spindles to accomplish both drilling and tapping simultaneously, the structure of the Everson patent is completely unsuitable, as the projecting lead screws from one drill head will contact the upright structure of the adjacent drill head.

Additionally, the sandwiching of spindle carrying heads between slotted sections of two spaced frames results in a lack of drill spindle rigidity which requires the use of drill jigs if accurate workpiece drilling is to be accomplished. Large industrial drills may be subjected to drilling pressures in excess of 20,000 psi, and consequently any movement of the Everson spindle support heads between the spaced circular frames will result in drilling inaccuracies.

Another known apparatus for simultaneously adjusting a plurality of drill spindles over equal distances employs a plurality of rotatable cylindrical members having peripherally disposed gear teeth. A centrally disposed rotatable control member carries gear teeth which mesh with the gear teeth of the cylindrical members so that rotation of the control member rotates all of the cylindrical members. Each cylindrical member carries an eccentrically positioned drill spindle, so that as the cylindrical members are rotated, the drill spindles change position. This construction is illustrated by U.S. Pat. No. 3,203,282 to Charles R. Wilson.

From a consideration of the Wilson patent, it becomes obvious that the degree of movement provided for each drill spindle is extremely limited, for the diameter of the supporting cylindrical members cannot be too large. With this structure, if a large number of drill spindles was required, the movement available for each spindle would be minute.

Although the simultaneous movement of a plurality of drill spindles over equal distances is highly desirable, the limitations of known structures for accomplishing this purpose have generally led to the development of multiple spindle drill heads wherein each spindle is individually adjustable such as illustrated in the U.S. Pat. No. 3,765,786 to Oeckl. This individual adjustment of each drill spindle to initially set up a drilling machine for simultaneous multiple drilling is both time consuming and subject to error. Additionally, such devices are not subject to automation and require a great deal of operator attention.

SUMMARY OF THE INVENTION

It is a general object of the subject invention to overcome the deficiencies of the prior art and in particular to provide a boring machine having multiple boring spindles positioned around a central machine axis wherein the spindles are all simultaneously radially movable with respect to the central axis by means of structure having a fixed outer radial extent.

It is another object of the present invention to provide a novel and improved boring machine having at least two adjacent boring heads as described above, each boring head providing a plurality of simultaneously positionable boring spindles.

Another object of the present invention is to provide a novel and improved boring machine which is adapted to simultaneously employ a first multiple spindle boring head to drill a plurality of holes in a first workpiece while employing a second adjacent multiple spindle boring head to drill a plurality of holes in a second workpiece or to tap the holes in a second workpiece which were drilled by said first boring head during a previous boring cycle.

It is yet another object of the subject invention to provide a boring machine such as described above further including spindle mounting means for mounting each said boring spindle on a boring machine frame for radial movment relative to a central axis in a manner to maintain the rotational axis for each boring spindle parallel to all other boring spindle rotational axes and to the central axis. Interconnecting the boring machine frame and the spindle mounting means is a spindle translating means for simultaneously moving each boring spindle relative to the machine axis along a lineal path between a first position in which each of the boring spindles is spaced at a predetermined minimum radial distance from the central axis and a second position in which each boring spindle is spaced at a predetermined maximum radial distance from the central axis.

A more specific object of the subject invention is to provide a boring machine as described above wherein the spindle translating means includes a rotatably mounted master ring gear surrounding the boring spindles and a plurality of lead screws extending between the master ring gear and the boring spindles, respectively. Each lead screw is mounted to rotate about its own longitudinal axis upon rotation of the master ring gear while the lead screw maintains a fixed position along its longitudinal axis relative to the machine axis. By this arrangement, the maximum radial extent of the spindle translating means remains fixed as the boring spindles are moved from their minimum to their maximum radial positions.

A still more specific object of this invention is to provide a support plate on the boring machine frame arranged generally perpendicularly to the central axis as described above wherein the support plate contains a plurality of lineal slots arranged radially with respect to the axis. The mounting structure for each boring spindle includes an upper bearing plate and a lower bearing plate positioned on each side of the support frame with a slot guide arranged generally between the upper and lower bearing plates and positioned within one of the lineal slots so as to guide the bearing plates along the upper and lower surfaces of the support plate as the corresponding boring spindle is moved between its inner and outer radial positions. This structural arrangement provides a maximum degree of rigidity for each boring spindle and thereby contributes to the ability of the boring machine to operate without positioning jigs.

Other objects of the disclosed invention include:

1. Greater accuracy in setting the exact diameter of the pattern defined by the positions of the respective boring spindles, 2. Provision of structure for allowing individual positioning of the boring spindles relative to one another, 3. Provision of quick change drill bit adapters for each boring spindle wherein the structure includes preloaded taper roller bearings to impart maximum rigidity and thus contribute further to the elimination of the need for drilling jigs, and 4. Provision of upper and lower bearing plates for each boring spindle configured so as to permit maximum support while allowing the smallest possible spacing from the machine axis.

Other and more specific objects of the subject invention will appear from the following summary of the drawings and the description of the preferred embodiments.

SUMMARY OF THE DRAWINGS

FIG. 1 is a front elevational view of a dual head boring machine embodying the subject invention wherein a pair of multiple spindle boring heads are disclosed for operating simultaneously on a pair of workpieces.

FIG. 5 is a perspective view of a boring head assembly including upper and lower trapezoidal bearing plates, an adapter and an attached drill bit.

DESCRIPTION OF THE PREFERRED EMBODIMENTS

Figure 2:
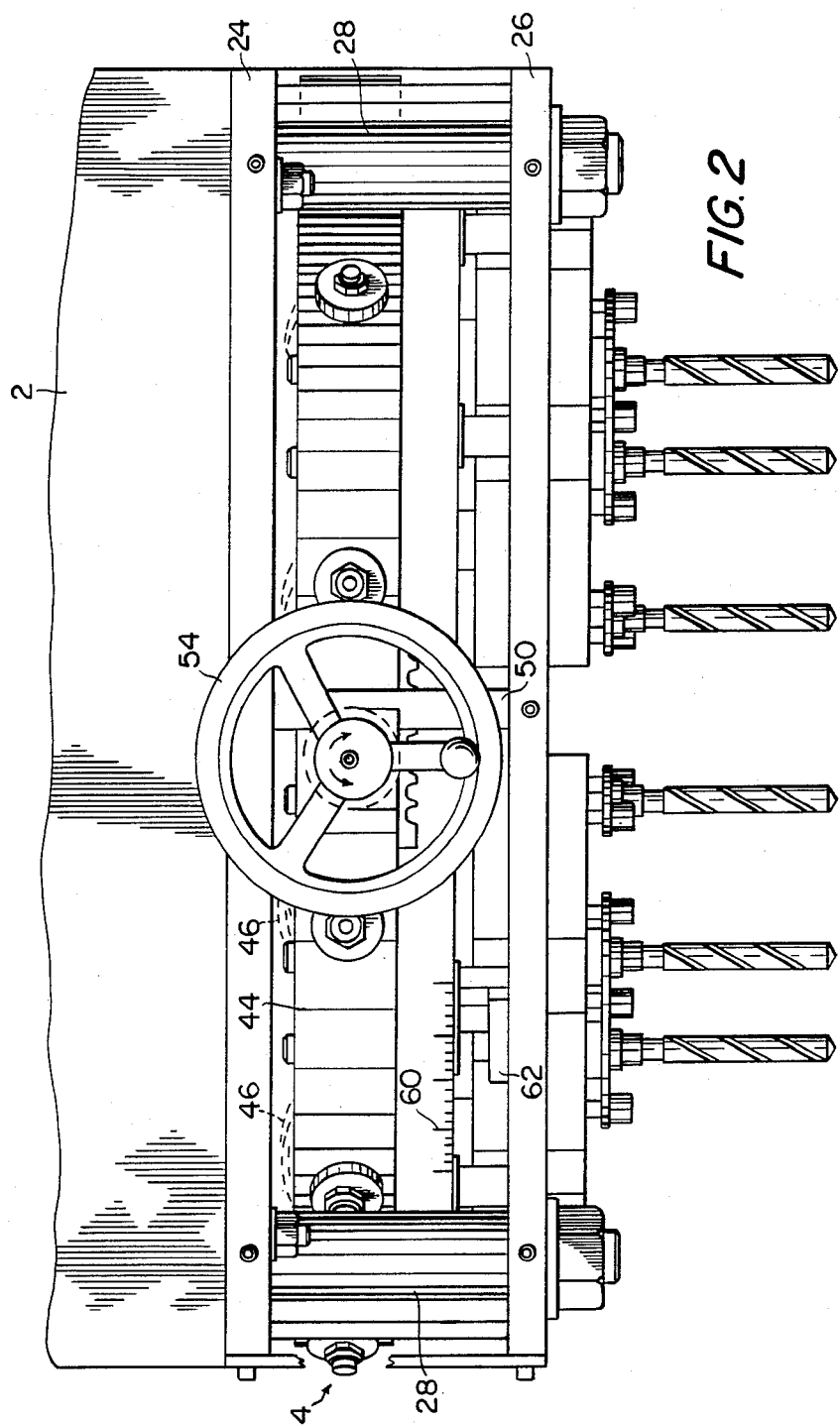
FIG. 2 is an enlarged fragmentary front elevational view of one of the multiple spindle boring heads illustrated in FIG. 1 wherein drill bits are operatively associated with each boring spindle by means of quick change adapters.

FIG. 1 illustrates, in elevation, a boring machine 2 equipped with a pair of multiple spindle boring heads 4 and 6 designed in accordance with the subject invention. Each multiple spindle boring head is provided with a plurality of spindle assemblies 8, each of which includes a boring spindle (described in greater detail below) which may be radially movable simultaneously with all other boring spindles so as to position a plurality of drill bits or tapping tools in a desired pattern around a central axis of each multiple spindle boring head. An important aspect of the disclosed invention is the provision of structure for automatically and simultaneously adjusting the boring spindles of the multiple spindle boring head wherein such structure has a fixed outer radial extent with respect to the central axis of each multiple spindle boring head. With this structure it is possible to mount two or more such multiple spindle boring heads side by side such as illustrated in FIG. 1 in relatively close proximity without compromising the maximum outer radial extent to which each boring spindle may be moved. The very close positioning of the multiple spindle boring heads as illustrated in FIG. 1 would not be possible with those prior art devices in which the lead screws used to position each boring spindle were caused to move outwardly, radially, like the spokes of a wheel.

The close spacing of two multiple spindle boring heads facilitates the automation and efficient manufacture of mechanical components requiring plural bore holes since such components may be mounted on a single indexing work conveyor for two successive work operations. For example, FIG. 1 illustrates a boring machine which includes a circular indexing table 10 on which a pair of pedestals 12 and 14 support work holders 16 and 18, respectively, for holding work pieces beneath the multiple spindle boring heads 4 and 6. If the multiple spindle boring heads are provided with a drill bit 20 for each boring spindle of head 4 and a tapping tool 22 for each spindle in head 6, a pattern of bore holes may be formed in a work piece and thereafter tapped by a process including the steps of (1) positioning the drill bits 20 and taps 22 in corresponding positions, (2) mounting a work piece in one of the work holders (i.e. 16) (3) positioning the work piece beneath boring head 4, (4) advancing the boring head 4 relative to the work piece so as to cause the drill bits to form bore holes in the work piece, (5) retracting the bore heads, (6) rotating the circular indexing table 180° and mounting a second work piece in work holder 18, and (7) again advancing bore head 4 and also bore head 6 so as to cause the drill bits 20 to form bore holes in the second work piece while the tapping tools 22 of bore head 6 tap the bore holes formed in the first work piece during the previous advance of boring head 4. The circular indexing table is again rotated 180° so as to permit the work piece in work holder 16 to be removed and a third work piece mounted thereon so that boring heads 4 and 6 may be again advanced with respect to the circular indexing table 10 to drill the desired pattern of bore holes in the third work piece while tapping the previously drilled bore holes in the second work piece. This sequence of drilling bore holes in a work piece, subsequently tapping the bore holes by rotating the circular indexing table 180°, and replacing a previously tapped work piece with a new unbored and untapped work piece can be continued indefinitely. Thus, a rather common multi step manufacturing task can now be performed at a single, relatively compact work station by means of a pair of multi spindle boring heads each of which is adjustable automatically to position a plurality of boring spindles in a desired pattern without interfering with the operation of the other boring head.

Turning now to FIG. 2, an enlarged fragmentary side elevational view of a multiple spindle boring head 4 is illustrated including an upper mounting plate 24 which may be bolted or otherwise attached to the boring machine 2 (only partially illustrated). A rotational drive connection (not illustrated) for each of the boring spindles is provided by the boring machine 2 through universal connections to a central drive (also not illustrated). Mounted beneath upper mounting plate 24 is a support plate 26 connected with but spaced from plate 24 by means of four corner posts 28 only two of which are illustrated in FIG. 2.

Figure 3:
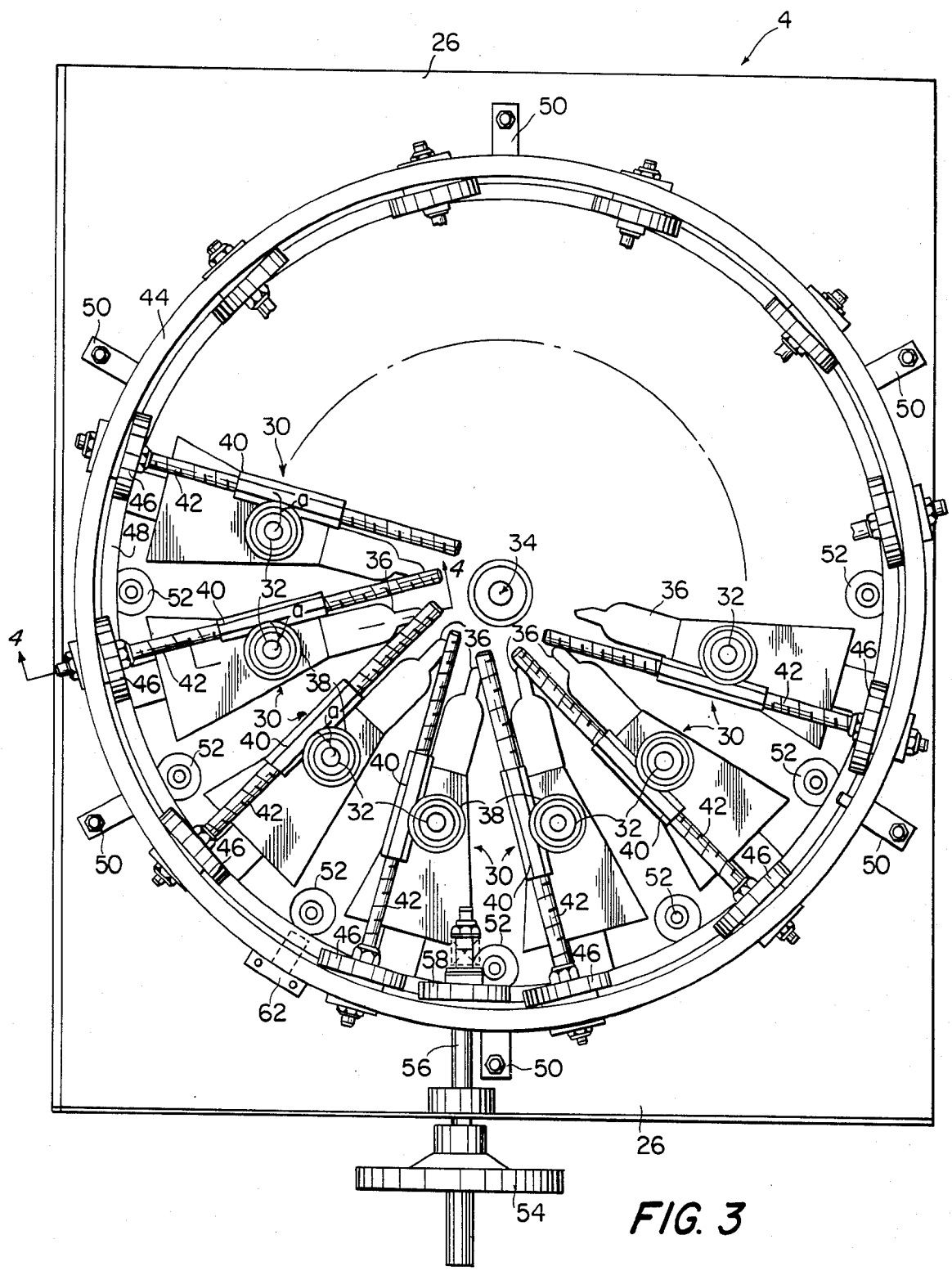
FIG. 3 is a top elevational view of the multiple spindle boring head of FIG. 2.

The design and operation of a multiple boring spindle head designed in accordance with the subject invention can best be understood by reference to both FIGS. 2 and 3. In particular, the boring head 4 includes a plurality of spindle assemblies 30, each one including a rotatable boring spindle 32 adapted to be moved radially with respect to a central axis 34, which in the specific embodiment illustrated in FIGS. 1-3 constitutes a vertical machine axis with respect to which the rotational axis of each boring spindle 32 is parallel. The boring spindle assemblies 30 are arranged to be moved radially with respect to the central axis by sliding along a plurality of radially extending, lineal slots 36, respectively, formed in support plate 26. The exact manner of supporting the boring spindles for radial movement relative to the support plate will be described in more detail hereinbelow. Each boring spindle assembly 30 includes a tubular housing 38 to which is fixedly mounted a threaded nut 40 with a longitudinal axis arranged generally parallel to the associated slot 36 within which the corresponding boring spindle assembly 30 is arranged to travel.

Each boring spindle assembly 30 is caused to move radially by means of a lead screw 42 threadably received within respective nuts 40 and journaled at one end in a fixed bearing ring 44 as will be discussed in greater detail hereinbelow. The end of each lead screw 42 which is journaled in the fixed bearing ring 44 is constrained against movement relative to the longitudinal axis of the lead screw but is nevertheless free to rotate thereabout. A pinion gear 46 is keyed to each lead screw 42 and is arranged to engage a circumferential ring gear 48 mounted on support plate 26 so as to rotate about the central machine axis 34. Rotation of ring gear 48 causes each lead screw 42 to rotate simultaneously about its longitudinal axis thereby causing the associated boring spindle assembly 30 to be displaced along the longitudinal axis of the associated slot 36. Normally the pitch and direction of threads on all lead screws 42 is chosen to be identical so that the boring spindle assemblies will move simultaneously at the same speed along their respective slots. As clearly shown in FIG. 3, the lead screws are off set from the rotational axis of each boring spindle at a distance "a" so that the respective boring spindle assembly may be moved from one end of the associated slot 36 to the other end in a manner which does not cause the lead screws 42 to interfer with the movement of the associated boring spindle assemblies.

Fixed bearing ring 44 is spaced above support plate 26 by a plurality of support brackets 50 and ring gear 48 is rotatably mounted on support bearings 52 which will be described in greater detail with reference to FIG. 4. Rotation of ring gear 44 is affected by means of a hand crank 54 fixed to one end of a rotatably mounted shaft 56 having a pinion gear 58 fixed to the opposite end of shaft 56. Since the teeth of pinion gear 58 mesh with the teeth of the ring gear 48, rotation of hand crank 54 causes ring gear 48 to rotate about central axis 34 and thus produces longitudinal movement of each boring head assembly in a radial direction defined by associated slot 36 contained in support plate 26. As best illustrated in FIG. 2, the outer circumferential surface of ring gear 48 is provided with graduations 60 which in cooperation with a pointer assembly 62 mounted on support plate 26 provides an accurate indication of the position of the spindle assemblies.

Figure 4:
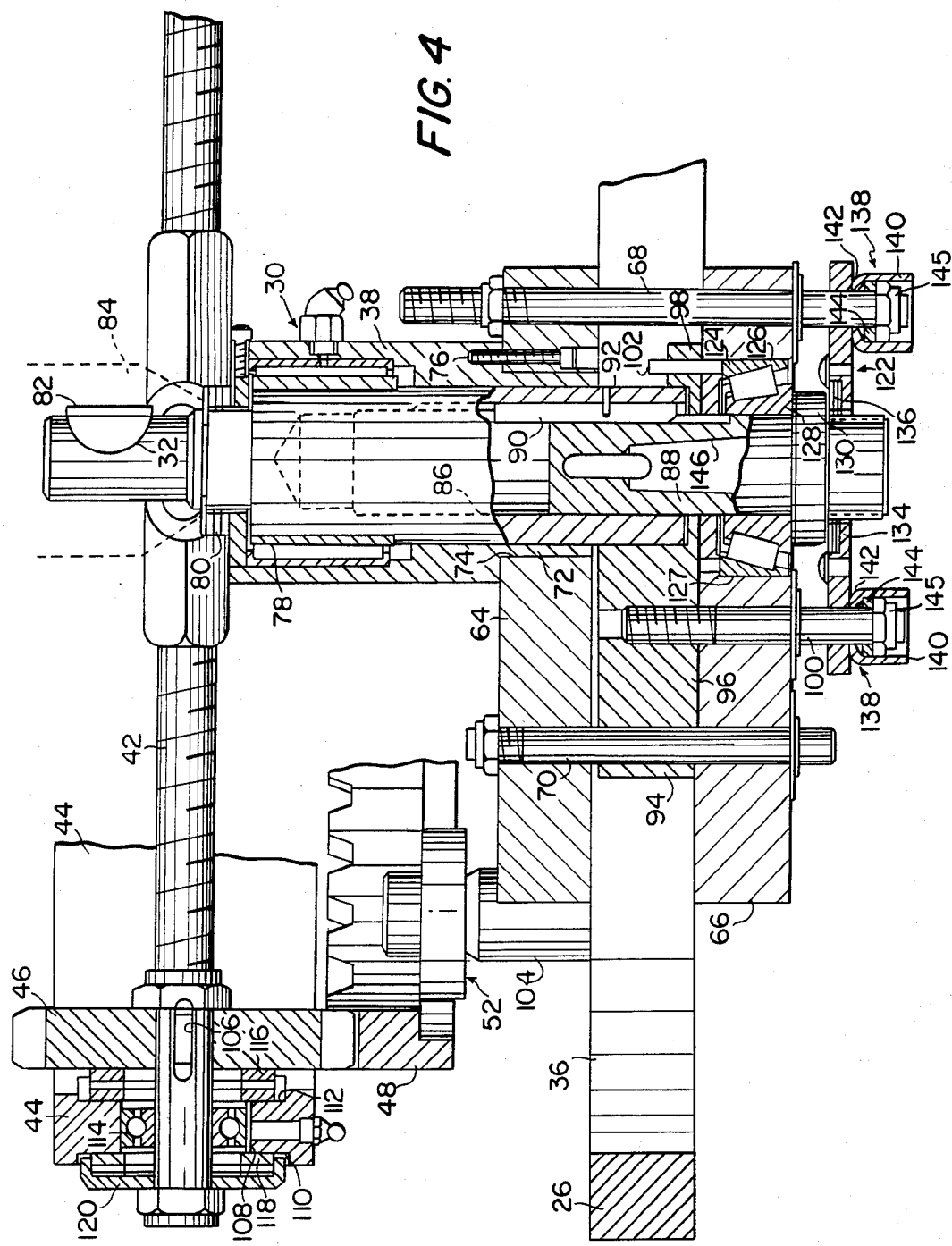
FIG. 4 is a partial cross-sectional view of a boring spindle assembly taken along lines 4—4 of FIG. 3.

Referring now to FIG. 4, a boring head assembly 30 is illustrated in cross section along with a fragmentary portion of the bearing ring 44 and the ring gear 48. The spindle assembly 30 includes upper bearing plate 64 and lower bearing plate 66 in contact with the upper and lower surfaces of support plate 26. The upper and lower bearing plates 64 and 66 are interconnected by an inner stud 68 and an outer stud 70 both of which extend through aligned apertures in the upper and lower bearing plates and through a slot 36 contained in the support plate 26. For reasons which will be more apparent hereinafter, the inner stud 68 extends downwardly below the lower surface of lower bearing plate 66 more than does outer stud 70. Connected to the upper bearing plate 64 is the tubular housing 38 having a lower end 72 adapted to fit within an aperture 74 contained within upper bearing plate 64 and held therein by means of a plurality of socket head screws 76 (only one of which is illustrated). At the upper end of tubular housing 38, a recessed cavity is formed to receive a radial bearing assembly 78 for journaling spindle 32 within the tubular housing 38. The upper end of spindle 32 is provided with a thrust bearing assembly 80. The upper end of spindle 32 is further provided with a Woodruff key 82 for fixedly connecting spindle 32 to the lower end 84 of a drive train illustrated in phantom lines. The lower end of spindle 32 has an axially opening cavity 86 for receiving an adapter 88 for mounting a drill bit, tap or other type of tool in the boring spindle. Adapter 88 is rotatably fixed to spindle 32 by means of a key 90 held in place within the cavity 86 by means of a pin 92 so that the adapter 88 may be inserted and withdrawn from the spindle cavity 86 as desired by the boring machine operator.

To insure that the boring spindle assembly 30 moves precisely along the associated slot 36, a slot guide 94 is positioned within slot 36 between upper and lower bearing plates 64 and 66 having an outer portion 96 on one side of spindle 32 and an inner portion 98 on the other side of spindle 32. Slot guide 94 is connected to lower bearing plate 66 by means of a center stud 100 passing through lower bearing plate 66 and threadably received in slot guide 94. The inner portion 98 of slot guide 94 is adapted to receive a pin 102 which passes into lower bearing plate 66 to prevent relative rotation between the slot guide 94 and the lower bearing plate 66. Outer stud 70 also passes through an aperture in slot guide 94 as illustrated in FIG. 4.

Ring support bearing 52 is illustrated in FIG. 4 as being spaced above support plate 26 by means of a spacer 104 which has a vertical extent in excess of the vertical thickness of upper bearing plate 64. By this arrangement, ring gear 48 may be held above support plate 26 by a distance which is sufficient to permit the outermost portions of the upper bearing plate 64 to pass beneath ring gear 48 as the boring spindle assembly 30 is moved toward its outermost radial position relative to the central machine axis 34.

The manner of journaling the outer end of each lead screw 42 to fixed bearing ring 44 is also illustrated in FIG. 4. The outer end of lead screw 42 passes through a bearing aperture 108 in the fixed bearing ring 44 having inner and outer recessed shoulders 110 and 112. A radial bearing assembly 114 may be provided within bearing aperture 108 to rotatably journal the lead screw and an inner thrust bearing assembly 116 and an outer thrust bearing assembly 118 may be provided on either side of the bearing aperture 108 to engage the inner and outer recess shoulders 112 and 110, respectively, and to provide in combination with pinion gear 46 and bearing cap 120 means by which a lead screw can be held in a fixed position relative to its own longitudinal axis. Note that pinion gear 46 is keyed to lead screw 42 by key 106. As is apparent from FIG. 4, lock nuts are provided on opposing sides of pinion gear 46 and bearing cap 120 to permit the pinion gear 46 to be axially adjusted along the lead screw 42 independently of the rotation of ring gear 48. By this arrangement, the various boring spindle assemblies 30 may be individually adjusted along their respective slots 36 to insure proper alignment and positioning of the boring spindles relative to one another and to the central machine axis 34.

Figure 6:
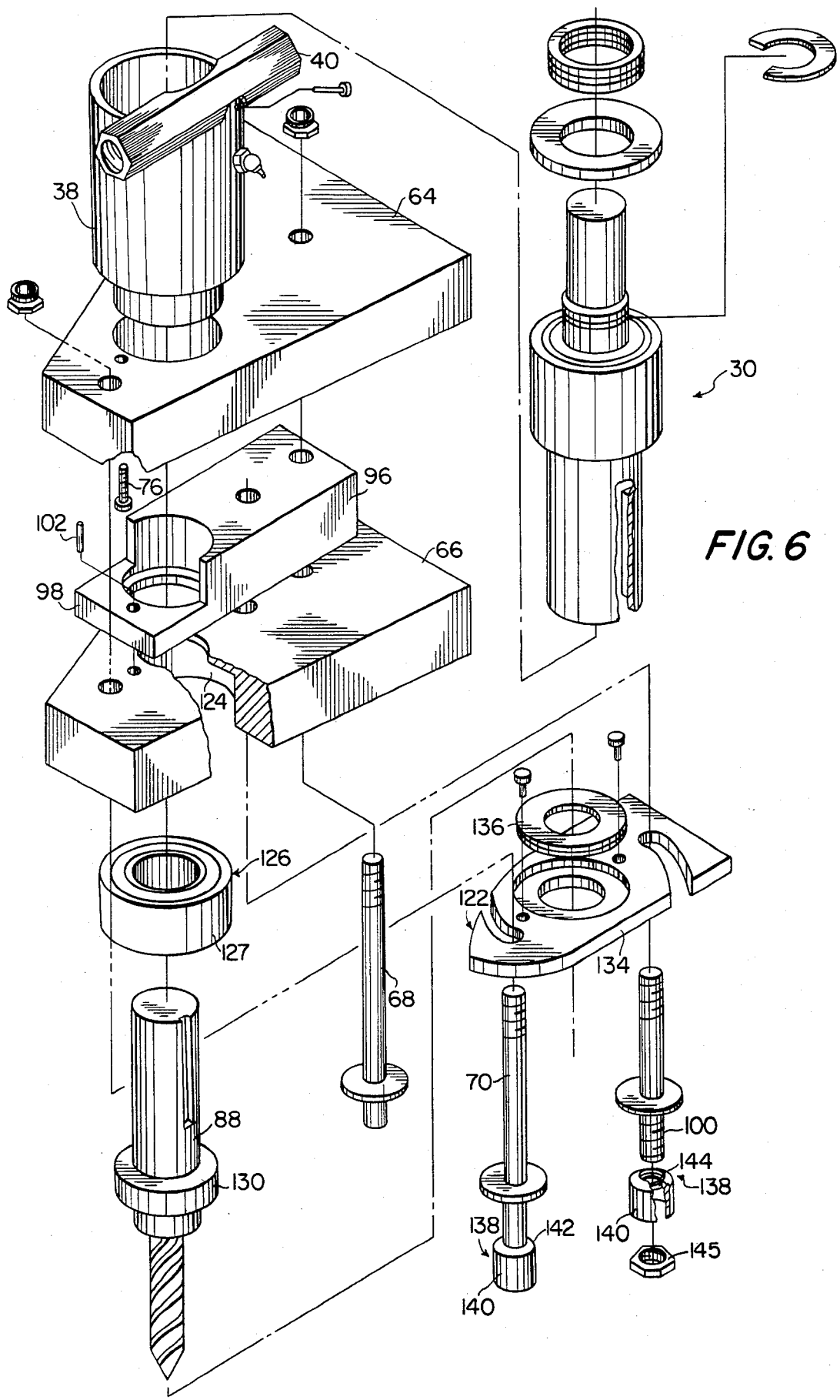
FIG. 6 is an exploded perspective view of the boring head assembly of FIG. 5.

Reference is now made jointly to FIGS. 4, 5 and 6 wherein the latter wherein the latter two disclose a boring head assembly 30 showing in greater detail the exact configuration of the various parts thereof and a cooperating quick change adapter support 122 which is designed to permit very quick changes in the drill bits or tape employed with the various boring spindles assemblies while at the same time providing such accurate positioning that the need for positioning jigs is entirely eliminated. In particular, it should be noted that the upper and lower bearing plates 64 and 66, respectively, are trapezoidally shaped on the perimeter thereof whereby the various boring head assemblies may be moved inwardly toward the central machine axis 34 as far as possible while at the same time providing the maximum possible support for each boring spindle assembly.

At the lower end of the boring spindle assembly, the depending portions of the inner stud 68 and the center stud 100 are adapted to connect with a quick change support 122 for adapter 88. In particular, lower bearing plate 66 includes a recessed cavity or bearing cup 124 for receiving a tapered bearing assembly 126 the outer race 127 of which engages the recessed cavity 124 and the inner race 128 of which engages the outer surface of adapter 88. A shoulder 130 on adapter 88 is biased against the lower radial surface of inner race 128 by means of a hook plate 134 carrying a thrust bearing assembly 136 through which is applied an upward biasing force to shoulder 130 without impeding the rotational freedom of the adapter 88. Biasing means 138 are mounted on the outer extremities of studs 68 and 100 so as to provide the desired biasing force to hook plate 134. Each biasing means 138 includes a cup shaped stop member 140 mounted on the extremities of the studs 68 and 100, respectively. The stop members 140 are mounted for axial movement on the respective studs 68 and 100 and are provided with an upper hemispherically shaped cam surface 142 arranged to engage hook plate 134 as the hook plate is rotated about the spindle axis so as to cause the stop members to move downwardly toward the extremity of the associated stud 68 or 100. A neoprene preload washer 144 is provided between the inner surface of the cup shaped stop members 140 and a threaded nut 145 mounted on the extremity of each stud 68 and 100 so as to provide spring biasing force through the stop member to the hook plate 134 to preload the tapered bearing 126 and thus eliminate the need for a positioning jig. Adapter 88 includes an axially downwardly opening cavity 146 for receiving the shank of a drill bit or tap which may be inserted in the adapter prior to securing the adaptor in the spindle assembly. Studs 68 and 100 combined with hook plate 134 cooperate to form a releasable securing means for securing the adaptor to be driven by the boring spindle 32 when the adapter 88 is inserted into the receiving end of the boring spindle. As can be seen from FIGS. 4, 5 and 6, the hook plate 134 is arranged perpendicularly when in the secured position with respect to the rotational axis of the associated spindle 32. Any tool which is to be driven by spindle 32 may be very quickly inserted into the axially opening cavity 86 by arranging the hook plate in a position to clear stud 68 and 100 as the adapter is moved upwardly into cavity 86 followed by rotation of the quick change support or securing means about the rotational axis of this spindle to cause the hook end portions containing slots 146 and 148 of the hook plate 134 to first engage stop members 140 and to move the stop members downwardly as the hook portions are moved into a fully engaged position with the respective studs 68 and 100. Of course other types of spring means may be substituted for the preload washers 144 such as a coiled compression spring.

Operation of the multiple spin head designed in accordance with the subject invention is now apparent from the above description. Of course, the number of spindles can be varied in accordance with the number of bore holes it is desired to drill. It is also possible to modify the number of lead screws which are engaged with the gear ring 48 to cause selected ones of the spindle assemblies to advance or retract in response to rotational movement of the gear ring 48. It is also possible to employ lead screws having different thread pitch to cause the associated spindle assemblies to advance at different rates. By this arrangement, a predetermined ratio in the corresponding distances of the various spindle assemblies measured from the central machine axis 34 may be maintained as the spindles are moved. Yet another advantage of the subject disclosure is that a large circumferential displacement of the gear ring 48 may cause only a relatively small linear displacement in each spindle assembly connected to the ring gear 48 through corresponding pinion gears 46 and lead screws 42. This result obtains so long as the diameter of the pinion gears is relatively small compared to the diameter of the ring gear 48 and the pitch of the threads on each lead screw 42 is large compared to the overall length of the lead screw. Accordingly, the individual spindle assemblies can be very accurately positioned relative to the central machine axis 34. Still other advantages of the subject invention are apparent from the above description of the preferred embodiment.

What is claimed is:

1. Apparatus for simultaneously positioning a plurality of rotatable spindles comprising:

(a) a machine frame including a support plate having an upper and a lower surface arranged generally perpendicular to a machine axis, said support plate containing a plurality of lineal slots extending therethrough and arranged radially with respect to the machine axis and equally spaced angularly about said axis;

(b) a group of spindle assemblies, each said spindle assembly including a boring spindle journaled for rotation about a spindle axis;

(c) spindle mounting means for mounting each said boring spindle on said machine for radial movement relative to a machine axis in a manner to maintain said spindle axes parallel to all other spindle axes and to said machine axis, said spindle mounting means including, for each said spindle assembly, bearing means comprising an upper bearing plate having a flat bearing surface in sliding contact with the upper surface of said support plate, a spindle housing formed on said upper bearing plate, said boring spindle being mounted within said spindle housing, and a lower bearing plate having a flat bearing surface in sliding contact with the lower surface of said support plate, said flat bearing surfaces extending across and on either side of each said slot in said support plate, means extending through said support plate to connect said upper and lower bearing plates and a slot guide connected to said bearing means and positioned within the slot across which said bearing surfaces extend; and (d) spindle translating means interconnected between said machine frame and said spindle mounting means for simultaneously moving each said boring spindle relative to said machine axis along a lineal path between a first position in which each said boring spindle is spaced at a predetermined minimum radial distance from said machine axis and a second position in which each said boring spindle is spaced at a predetermined maximum radial distance from said machine axis while said spindle translating means maintains a fixed radial extent at all times relative to said machine axis as said boring spindles move between said first and second positions, said translating means insulating a rotatably mounted master ring gear surrounding said spindle assemblies, and a plurality of lead screw means extending between said master ring gear and said spindle assemblies, respectively, each said lead screw means being mounted to rotate about its longitudinal axis upon rotation of said master ring gear while maintaining a fixed position along its longitudinal axis relative to said machine axis, each said spindle assembly including threaded means mounted on said spindle housing for engaging an associated lead screw means to cause the associated boring spindle to move toward said first position when said lead screw means rotates in one direction and to move toward said second position when said lead screw means rotates in an opposite direction, said master ring gear being positioned above the upper surface of said support plate by a distance which exceeds the thickness of said upper bearing plates, and said elongated slots extending sufficiently to permit said upper bearing plates to move between said master ring gear and said support plate when said boring spindles are moved to said second position.

2. Apparatus as defined in claim 1 wherein the longitudinal axis of each said lead screw means is offset from the spindle axis of the associated boring spindle, whereby each said lead screw imposes no limitations upon the radial extent to which each associated boring spindle may be moved.

3. Apparatus as defined in claim 1, wherein each said lead screw means includes an elongated lead screw and a pinion gear intermeshed with said master ring gear, said pinion gears being fixedly mounted on said lead screws, respectively; each said pinion gear is keyed to the associated lead screw and is adjustable with respect to the longitudinal axis of said lead screw and wherein said spindle translating means includes a plurality of lock nuts associated with said lead screws, respectively, to lock selectively said pinion gears with respect to said lead screws to permit individual adjustment in the position of each boring spindle along the longitudinal axes of said lead screws.

4. Apparatus as defined in claim 1, wherein said lead screw means have different pitches to cause the associated boring spindles to move at different rates along said lead screw means, respectively, for a given rotation of said master ring gear thereby to maintain a predetermined pattern defined by the relative position of said boring spindles.

5. Apparatus as defined in claim 1, wherein each said boring spindle includes a drill bit receiving end and wherein each said spindle assembly further includes (1) a drill bit adapter means for forming a driving connection between the associated boring spindle and a drill bit, and (2) a releasable securing means for securing said drill bit adapter means to said boring spindle when said drill bit adapter is inserted into said receiving end of said boring spindle and rotated about the spindle axis of said boring spindle.

6. Apparatus as defined in claim 5, wherein said boring spindle of each said spindle assembly extends through the associated upper bearing plate of said spindle mounting means, said releasable securing means of each said spindle assembly includes a pair of studs connected with and extending outwardly from said associated lower bearing plate, said studs being positioned on opposed sides of the associated boring spindle at equal distances from the spindle axis thereof, and further wherein said releasable securing means includes a hook plate arranged perpendicularly with respect to said spindle axis when said drill bit adapter means is secured by said releasible securing means, said hook plate containing hook openings arranged to hook around said pair of studs when said drill bit adapter means is located about said spindle axis.

7. Apparatus as defined in claim 6, wherein said lower bearing plate of each said spindle mounting means includes a tapered bearing for journalling said drill bit adapter means and wherein said securing means includes biasing means for applying a biasing force to said hook plate in a direction to preload said tapered bearing.

8. Apparatus as defined in claim 7, wherein said biasing means includes a pair of cup shaped stop members movably mounted, respectively, on the extremities of said studs, each said stop member including a cam surface arranged to engage said hook plate as said hook plate is rotated about said spindle axis to cause said stop members to be moved toward the extremity of the associated stud, and wherein said biasing means further includes spring means for urging said stop member against said hook plate.

9. Apparatus for simultaneously positioning a plurality of rotatable spindles comprising:
  (a) a machine frame including a support plate arranged generally perpendicular to a machine lineal slots arranged radially with respect to the machine axis equally spaced angularly about said axis,
  (b) a first group of spindle assemblies, each said spindle assembly including a boring spindle journaled for rotation about a spindle axis;
  (c) spindle mounting means for mounting each said boring spindle on said machine frame for radial movement relative to the machine axis in a manner to maintain said spindle axes parallel to all other spindle axes and to said machine axis, said spindle mounting means including, for each said spindle assembly, an upper bearing plate, a lower bearing plate and a slot guide positioned within one of said lineal slots and connected with at least one of said upper and lower bearing plates, whereby each said spindle assembly is caused to move along a lineal path defined by said associated lineal slot; and
  (d) spindle translating means interconnected between said machine frame and said spindle mounting means for simultaneously moving each boring spindle relative to said machine axis along a lineal path between a first position in which each said boring spindle is spaced at a predetermined minimum radial distance from said machine axis and a second position in which each said boring spindle is spaced at a predetermined maximum radial distance from said machine axis while said spindle translating means maintains a fixed radial extent at all times relative to said machine axis as said boring spindles more between said first and second positions, said spindle translating means including a rotatably mounted master ring gear surrounding said spindle assemblies, and a plurality of lead screw means extending between said master ring gear and said boring spindle assemblies, respectively, each said lead screw means being mounted to rotate about its longitudinal axis upon rotation of said master ring gear while maintaining a fixed position along its longitudinal axis relative to said machine axis; and wherein each said spindle assembly includes threaded means for engaging an associated lead screw means to cause the associated boring spindle to move toward said first position when said lead screw means rotates in one direction and to move toward said second position when said lead screw means rotates in an opposite direction, said master ring gear being positioned above the upper surface of said support plate by a distance which exceeds the thickness of said upper bearing plates and wherein said lineal slots extend sufficiently to permit said upper bearing plates to move between said master ring gear and said support plate when said boring spindles are moved to said second positions.

10. Apparatus for simultaneously positioning a plurality of rotatable spindles, comprising
  (a) a machine frame;
  (b) a first group of spindle assemblies, each said spindle assembly including a boring spindle journaled for rotation about a spindle axis;
  (c) spindle mounting means for mounting each said boring spindle on said machine frame for radial movement relative to a machine axis in a manner to maintain said spindle axes parallel to all other spindle axes and to said machine axis; and
  (d) spindle translating means interconnected between said machine frame and said spindle mounting means for simultaneously moving each said boring spindle relative to said machine axis along a lineal path between a first position in which each said boring spindle is spaced at a predetermined minimum radial distance from said machine axis and a second position in which each said boring spindle is spaced at a predetermined maximum radial distance from said machine axis while said spindle translating means maintains a fixed radial extent at all times relative to said machine axis as said boring spindles move between said first and second positions, said spindle translating means including a rotatably mounted master ring gear surrounding said spindle assemblies, and a plurality of lead screws extending between said master ring gear and said boring spindle assemblies, respectively, each said lead screw being mounted to rotate about its longitudinal axis upon rotation of said master ring gear while maintaining a fixed position along its longitudinal axis relative to said machine axis; and wherein each said spindle assembly includes threaded means for engaging an associated lead screw to cause the associated boring spindle to move toward said first position when said lead screw rotates in one direction and to move toward said second position when said lead screw rotates in an opposite direction, said lead screws having different pitches to cause the associated boring spindles to move at different rates along said lead screws, respectively, for a given rotation of said master ring gear thereby to maintain a predetermined pattern defined by the relative position of said boring spindles, a plurality of pinion gears intermeshed with said master ring gear and fixedly mounted upon said lead screws, respectively, each said pinion gear being keyed to the associated lead screw and adjustable with respect to the longitudinal axis of said lead screw, and a plurality of lock nuts associated with said lead screws, respectively, to lock selectively said pinion gears with respect to said lead screws to permit individual adjustment in the position of each boring spindle along the longitudinal axes of said lead screws, said boring spindles being adjustable to be positioned at different radial distances, respectively, from said machine axis.

11. Apparatus for simultaneously positioning a plurality of rotatable spindles comprising:
  (a) a machine frame including a support plate having an upper and lower surface arranged generally perpendicular to a machine axis, said support plate containing a plurality of lineal slots extending therethrough and arranged radially with respect to the machine axis and equally spaced angularly about said axis;

(b) a group of spindle assemblies, each said spindle assembly including a boring spindle journaled for rotation about a spindle axis;

(c) spindle mounting means for mounting each said boring spindle on said machine frame for radial movement relative to a machine axis in a manner to maintain said spindle axes parallel to all other spindle axes and to said machine axis, said spindle mounting means including, for each said spindle assembly, bearing means comprising an upper bearing plate having a slot bearing surface in sliding contact with the upper surface of said support plate and a lower bearing plate having a flat bearing surface in sliding contact with the lower surface of said support plate, said slot bearing surfaces extending across and on either side of each said slot in said support plate, means extending through said support plate to connect said upper and lower bearing plates and a slot guide connected to said bearing means and positioned within the slot across which said bearing surfaces extend; and (d) spindle translating means inteconnected between said machine frame and said spindle mounting means for simultaneously moving each said boring spindle relative to said machine axis along a lineal path between a first position in which each said boring spindle is spaced at the same predetermined minimum radial distance from said machine axis and a second position in which each said boring spindle is spaced at the same predetermined maximum radial distance from said machine axis while said spindle translating means maintains a fixed radial extent at all times relative to said machine axis as said boring spindles move between said first and second positions, said first and second positions defining the extent of said lineal path, said spindle translating means including a rotatably mounted master ring gear surrounding said spindle assemblies and positioned above the upper surface of said support plate by a distance which exceeds the thickness of said upper bearing plates, and a plurality of lead screw means extending between said master ring gear and said boring spindle assemblies, respectively, each said lead screw means being mounted to rotate about its longitudinal axis upon rotation of said master ring gear while maintaining a fixed position along its longitudinal axis relative to said machine axis; and each said spindle assembly including threaded means for engaging an associated lead screw means to cause the associated boring spindle to move toward said first position when said lead screw means rotates in one direction and to move toward said second position when said lead screw means rotates in an opposite direction, the slots in said support plate extending sufficiently to permit said upper bearing plates to move between said master ring gear and said support plate when said boring spindles are moved to said second position.

12. Apparatus as defined in claim 11, wherein said upper and lower bearing plates are trapezoidal in shape with lateral edges on either side of said slot defining the sloping sides of the trapezoid and inner and outer edges extending transverse to said slot between said lateral edges, said inner edge being of substantially less length than said outer edge and being positioned closest to said machine axis.

13. Apparatus as defined in claim 11 wherein said lead screw means each includes an elongated lead screw and a pinion gear intermeshed with said master ring gear, said pinion gears are fixedly mounted on said lead screws, respectively, each said pinion gear is keyed to the associated lead screw and is adjustable with respect to the longitudinal axis of said lead screw and wherein said spindle translating means includes a plurality of lock nuts associated with said lead screws, respectively, to lock selectively said pinion gears with respect to said lead screws to permit individual adjustment in the position of each boring spindle along the longitudinal axes of said lead screws.

14. Apparatus as defined in claim 11 wherein said lead screw means includes elongated lead screws having different pitches to cause the associated boring spindles to move at different rates along said lead screws, respectively, for a given rotation of said master ring gear thereby to maintain a predetermined pattern defined by the relative position of said boring spindles.

15. Apparatus as defined in claim 11, wherein each said boring spindle extends through the associated upper bearing plate of said spindle assembly and includes a drill bit receiving end and wherein each said spindle assembly further includes (1) a drill bit adapter means for forming a driving connection between the associated boring spindle and a drill bit, and (2) a releasable securing means for securing said drill bit adapter means to said boring spindle when said drill bit adapter is inserted into said receiving end of said boring spindle and rotated about the spindle axis of said boring spindle, said releasable securing means including a pair of studs connected with and extending outwardly from said associated lower bearing plate, said studs being positioned on opposed sides of the associated boring spindle at equal distances from the spindle axis thereof, and a hook plate arranged perpendicularly with respect to said spindle axis when said drill bit adapter means is secured by said releasable securing means, said hook plate containing hook openings arranged to hook around said pair of studs when said drill bit adapter means is rotated about said spindle axis.

* * * * *